O. P. FRITCHLE.
METHOD OF CONTROL FOR MOTOR SYSTEMS.
APPLICATION FILED MAR. 23, 1912.

1,119,265.

Patented Dec. 1, 1914.
3 SHEETS—SHEET 1.

Witnesses
C. N. Walker
N. P. Leonard

Inventor
Oliver P. Fritchle
By Byrnes Townsend & Brickenstein
Attorneys

O. P. FRITCHLE.
METHOD OF CONTROL FOR MOTOR SYSTEMS.
APPLICATION FILED MAR. 23, 1912.
1,119,265.
Patented Dec. 1, 1914.
3 SHEETS—SHEET 2.
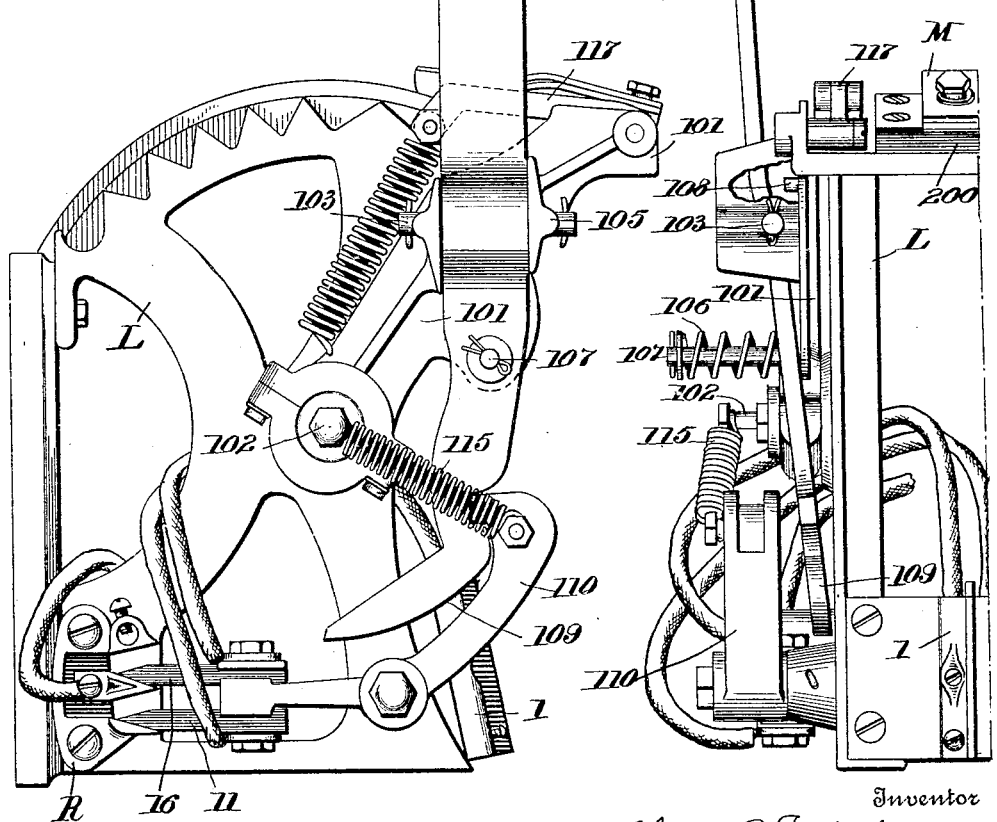

O. P. FRITCHLE.
METHOD OF CONTROL FOR MOTOR SYSTEMS.
APPLICATION FILED MAR. 23, 1912.

1,119,265.

Patented Dec. 1, 1914.

3 SHEETS—SHEET 3.

WITNESSES
C. N. Walker.
N. P. Leonard.

INVENTOR
Oliver P. Fritchle,
by Byrnes Townsend & Brickenstein
Attorney

UNITED STATES PATENT OFFICE.

OLIVER P. FRITCHLE, OF DENVER, COLORADO, ASSIGNOR TO THE FRITCHLE AUTOMOBILE & BATTERY COMPANY, OF DENVER, COLORADO, A CORPORATION OF COLORADO.

METHOD OF CONTROL FOR MOTOR SYSTEMS.

1,119,265.  Specification of Letters Patent.  Patented Dec. 1, 1914.

Application filed March 23, 1912. Serial No. 685,750.

*To all whom it may concern:*

Be it known that I, OLIVER P. FRITCHLE, a citizen of the United States, residing at Denver, in the county of Denver and State of Colorado, have invented certain new and useful Improvements in Methods of Control for Motor Systems, of which the following is a specification.

My invention relates to a system of control for shunt or compound wound electric motors, and has for its object to provide a system in which the regulation of the speed is effected by the use of regulating resistances in the shunt field circuit, and also, in the case of a compound wound motor, by the use of such resistances in the main circuit including the series field and armature.

A further object is to provide a simple and compact controller by which the various circuit changes can be made; and to combine with said controller a reversing switch operated by the controller handle.

Figure 1:
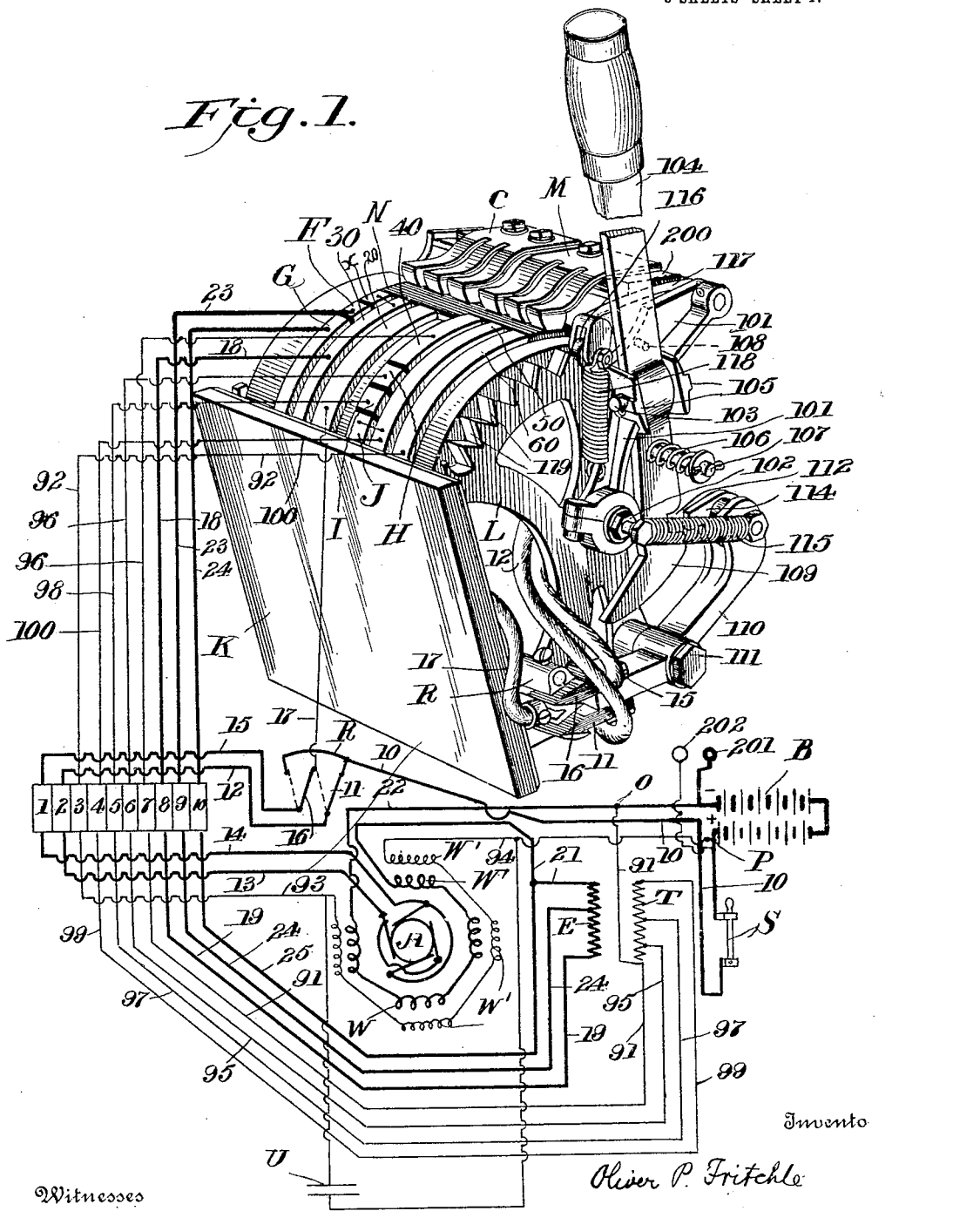
Figure 5:
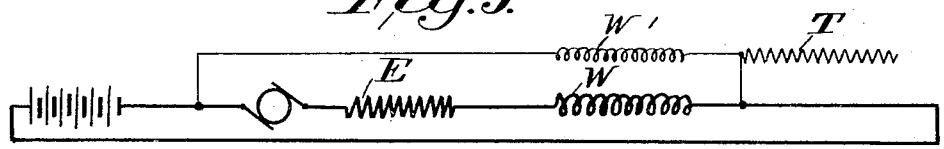
Figure 6:
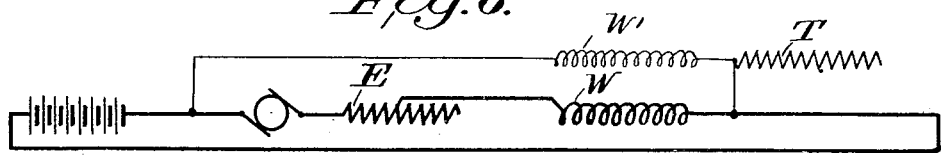
Figure 7:
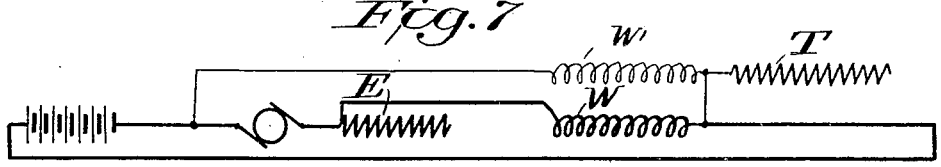
Figure 8:
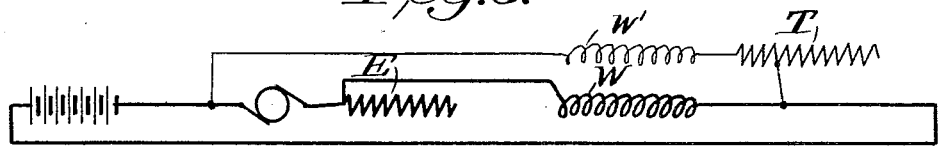
Figure 9:
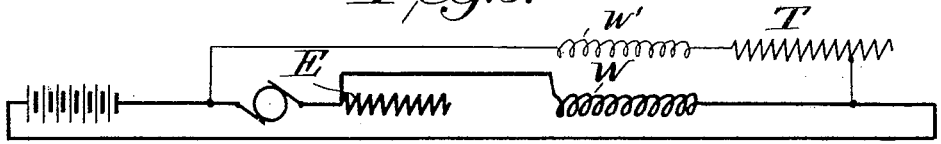
Figure 10:
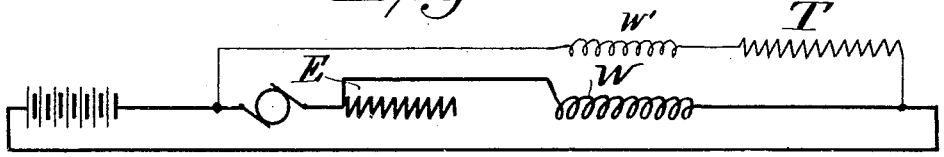

Referring to the drawings: Figure 1 is a perspective view of the controller with the circuit connections diagrammatically shown; Fig. 2 is an end elevation of the controller; Fig. 3 is a partial side elevation; Fig. 4 is a detail of the guard for the controller handle; and Figs. 5, 6, 7, 8, 9, 10 are diagrams of the circuit connections in various positions of the controller.

The controller comprises a base plate K to which are secured two end frames L on which are mounted a series of curved contact-strips, of which four marked 20, 30, 50 and 60 are continuous, and the two others are divided by insulating strips into separated contact-pieces. Two bridging contacts C and M rest in the off-position on the insulating block N, which is notched as shown, so that the bridge-piece M is the first to make its circuit connections in the last to break them. While this block has been shown as one piece it may obviously be made of separate pieces formed as extensions on the curved contact segments. These bridging contacts C, M, each have three spring fingers and are carried on an insulating bar 200, secured to an arm 101, which is in turn pivoted at 102 to the frame L.

On the arm 101, at 103, is pivoted the operating lever 104, this pivot 103 being supported on cheek pieces 105 formed as parts of the arm 101. Pivot 103 is substantially at right angles to the pivot of the arm 101, so that the operating arm 104 can swing transversely to the plane of operation of the arm 101. The lower end of the operating arm 104 is normally pressed inward by a spring 106 on a rod 107 secured to the frame L, while a pin 108 (Fig. 3) on the arm 101 prevents its upper end of the lever from moving too far inward. At its lower end, arm 104 has a cam 109 for operating the reversing switch lever 110, pivoted at 111. A notch 112 in the lever 104 enables the lever to pass the guard shoulder 114 on the reversing switch lever, only when the operating lever 104 is in the off-position, and prevents the forward movement of the controller handle unless in full reversing position sufficient to clear the guard shoulder 114.

115 is a tension spring to keep the reversing switch normally in the position shown; but by swinging lever 104 on pivot 103, and then moving the handle in the direction of the arrow, the full distance to clear the guard shoulder 114, the cam 109 will engage the end of switch 110, and shift contacts 16 and 11 to reverse the direction of the current. At the same time the arm 101, carrying the bridging contacts M, C, will be moved over the curved contact strips, the various steps being controlled by a roller 116 on lever 117 pivoted to arm 101, the roller being pulled by the spring 118 into the successive notches 119.

The motor is diagrammatically shown as having an armature A with four poles, W indicating the series field and W' the shunt field.

E is a variable resistance in the main or series circuit and T a variable resistance in the shunt field circuit. For convenience the connections to the various contacts of the controller and reversing switch are brought to a series of binding posts, 1 to 10, which are secured on the base of the controller frame and separately shown for convenience in the diagram.

Referring to the diagram portion of Fig. 1, the circuit connections in the various positions of the controller handle are as follows:

First position. From the positive end of battery B through switch S, wire 10, switch arm 11, wire 12, binding post 2, wire 13, armature A, wire 14, binding post 1, wire 15, arm 16, wire 17, segment 20, bridge contact C, segment X, which is connected directly across on the under side to segment 30, wire 18, binding post 8, wire 19, resistance E, wire 21, series field W, wire 22 to the negative pole of the battery. The segment 30 is merely an auxiliary contact segment, which is connected to the full resistance E, and the purpose of this segment is to prevent a serious sparking in case there should be a broken circuit due to a poor contact in passing from segments X to F and G. The shunt field connections are from the point P, wire 94, shunt field W', wire 93, binding post 3, wire 92, segment 60, bridge contact M, segment 40, (also to segment 50), wire 96, binding post 7, wire 91 to point O. The auxiliary segment 50 is connected to the full shunt resistance, thereby maintaining a constant contact in the shunt field. In case there should be a broken contact on any of the segments 40—H, I or J, it would prevent a heavy sparking. In this position, as will more clearly appear from the diagram of Fig. 5 all the series field resistance is included in the circuit, and none of the shunt field resistance, the shunt field being therefore fully excited.

Second position. The same connections remain, as in the first position, up to the segment 20, which is however now in connection through bridge contact C with the contact pieces 30 and F, thereby forming parallel circuits, one through wire 18, binding post 8, wire 19 and resistance E and the other through wire 23, binding post 9, wire 24, through part of resistance E, to wire 21, thence through the series field to the negative side of the battery, as before. The shunt connections in this position are the same as in the first position. In this position of the controller handle some of the series resistance has been cut out. This arrangement of the circuits is diagrammatically shown in Fig. 6.

Third position. In this position the positive end of the battery is connected to segment 30 to the curved contact-piece G on the controller and thence through wire 24, binding post 10, wire 25, past the resistance 21 to the series field, and thence as before. In this position, the series resistance has been entirely removed, there being no included resistance in either shunt or field circuit, as will more clearly appear from the diagram of Fig. 7.

Fourth position. The series connections are the same as in the third position, and the shunt connections are as follows:—From the point P on the positive side of the battery through wire 94, shunt field W', thence through wire 93 to binding post 3, wire 92 to segment 60, through bridge M, thence to contact piece H, (also to segment 50 and its connections), wire 96, binding post 6, wire 95, through part of resistance T, wire 91 to point O on the negative side of the battery. The connections in this position are diagrammatically shown in Fig. 8.

Fifth position. Like the previous position, except that the curved segment 60 is now in connection with curved contact piece I, whence the current flows through wire 98, binding post 5, wire 97, more of the resistance T, wire 91 to point O. The connections are diagrammatically shown in Fig. 9.

Sixth position. In this position, as will appear from the diagram Fig. 10, all the resistance has been included in the shunt field circuit. The connections from the curved contact piece 60 of the controller are through bridge contact M, segment J which is directly connected to segment 50, thence through wire 100 to binding post 4, wire 99, the whole of the resistance T and wire 91 to point O. A seventh speed, or a further increase in the speed of the motor, can be had by disconnecting or breaking the shunt field altogether, or an insulating segment could be used instead of the conductor segment J on the sixth speed, in which arrangement segment 50 would then only extend to the sixth position and an insulating segment would continue parallel to the insulating segment J.

It will be noted that the notch in the insulating piece N permits the bridge contact M to make connection with the segments 40, 50 and 60, which are in connection with the shunt field before the bridge contact C makes connection with the segments connection with the segments connected to the series field. It therefore follows that the shunt field is strongly magnetized at the outset, thus providing a powerful starting torque. In the reverse operation of the controller, the series field circuit is broken first and practically at battery voltage, so that even though the current may be comparatively heavy, the spark is not produced under induced high voltage. The shunt field circuit is broken last when the current is small and the corresponding spark is small. A condenser U may be used to absorb the self-induction discharge.

In shunt dynamos or shunt motors and in compound wound dynamos and motors, in which the shunt field carries the maximum ampere turns, the direction of rotation is the same whether the machine be acting as a generator or a motor and this fact is taken advantage of when the speed of the motor is sufficient, as in going down hill, to use the motor as a generator to recharge the battery and simultaneously act as a brake. This effect can best be produced when the connections are those described above for the third position of the controller, because the shunt field is then without inserted resistance, and the resistance in the armature and series fields is at a minimum. This current generating or re-charging effect is the more pronounced, as the ampere turns of the shunt field predominate over the ampere turns of the series field. In the case of my motor the shunt field may carry on normal load from 50 to 100% more ampere turns than the series field; consequently, when coasting down hill against the motor with the controller in third position the field is strongly magnetized by the shunt field, and the motor acting as a generator may generate a current as high as 40 to 50 amperes, which current charges the battery. It will be further noted that by the system above described, the regulation at higher speeds of running, as when the controller is in the fourth, fifth and sixth positions, is effected by varying the resistance in the low-amperage shunt-field, thereby avoiding the waste of energy due to shunting large quantities of current from a series field through resistances, as is done in the control of series motors.

At starting and at the lower speeds, the motor in effect acts as a series motor, having the strong torque desirable at starting while at higher speeds the motor has more of the characteristics of a shunt motor with the advantages of economical regulation above pointed out.

I claim:

1. A controller comprising two sets of curved contact strips, each set comprising continuous strips and a strip divided into insulated sections, one set being longer than the other, an insulating block abutting against the ends of said strips, two bridging contact-pieces, each having fingers to engage a contact strip, and a pivoted handle on which said contact-pieces are mounted.

2. A controller comprising two sets of curved contact strips, each set comprising continuous strips and a strip divided into insulated sections, one set being longer than the other, an insulating block abutting against the ends of said strips, two bridging contact-pieces, each having fingers to engage a contact strip, a pivoted handle on which said contact-pieces are mounted, and a spring controlled step-by-step device for determining the position of the contacts.

3. A controller comprising fixed contacts and movable contact devices arranged to engage therewith, a pivoted arm on which such movable devices are mounted, a reversing switch comprising an operating lever, means carried by said arm to operate said lever, and means for preventing such operation except when the contacts are disengaged.

4. In a circuit controller, a pivoted arm, circuit closing devices carried thereby, an operating lever pivoted to said arm, the pivots of the arm and lever being at right angles to each other, a switch lever arranged to be engaged by said operating lever, and means for preventing engagement except when the circuit closing devices are in open-circuit position.

5. In a circuit controller, a pivoted arm, circuit closing devices carried thereby, an operating lever pivoted to said arm, the pivots of the arm and lever being at right angles to each other, a spring for engaging said lever, a switch lever arranged to be engaged by such operating lever, and means for preventing engagement except when the circuit closing devices are in open-circuit position.

6. In a circuit controller, a pivoted arm, circuit closing devices carried thereby, an operating lever pivoted to said arm, the pivots of the arm and lever being at right angles to each other, a spring for engaging said lever, a switch lever arranged to be engaged by such operating lever, and means for preventing engagement except when the circuit closing devices are in open-circuit position, said means comprising a notch on the operating lever and a corresponding guard projection on the switch lever.

In testimony whereof I affix my signature in presence of two witnesses.

OLIVER P. FRITCHLE.

Witnesses:
C. H. OSBORN,
J. M. BLACK.

Copies of this patent may be obtained for five cents each, by addressing the "Commissioner of Patents, Washington, D. C."